United States Patent [19]
Robitzsch

[11] 4,389,664
[45] Jun. 21, 1983

[54] SYSTEM AND METHOD TO DERIVE A DIGITAL VIDEO CONTROL SIGNAL

[75] Inventor: Herbert Robitzsch, Erzhausen, Fed. Rep. of Germany

[73] Assignee: Robert Bosch GmbH, Stuttgart, Fed. Rep. of Germany

[21] Appl. No.: 282,730

[22] Filed: Jul. 13, 1981

[30] Foreign Application Priority Data

Jul. 17, 1980 [DE]  Fed. Rep. of Germany ....... 3027054

[51] Int. Cl.³ ............................................ H04N 9/535
[52] U.S. Cl. .................................................... 358/22
[58] Field of Search ......................... 358/12, 13, 21, 22

[56] References Cited
U.S. PATENT DOCUMENTS 4,240,112 12/1980 Inaba et al. .......................... 358/160

OTHER PUBLICATIONS
Journal of the SMPTE, vol. 87, No. 10, pp. 673–676, Oct. 1978.

*Primary Examiner*—Robert L. Richardson
*Attorney, Agent, or Firm*—Frishauf, Holtz, Goodman & Woodward

[57] ABSTRACT

To provide a readily available digital video frequency control signal derived from a video signal, one of the two chroma components is multiplied with the slope (m) of the angle of the chroma signal, and the respective product is subtracted from the other chroma component. The absolute value of the subtraction is subtracted from the absolute value of the first chroma component signal which had been multiplied with a factor representing the opening angle of the chroma sector. Upon simultaneous presence of a positive result in the subtraction, and a result in excess of a minimum threshold, representing minimum chroma saturation, a digital control signal is derived which can be used in further signal processing.

17 Claims, 6 Drawing Figures

SYSTEM AND METHOD TO DERIVE A DIGITAL VIDEO CONTROL SIGNAL

The present invention relates to digital video signal processing, and more particularly to a method and system to derive a digital control signal of video frequency from a digital video signal, especially a switching signal for use in the chroma-key mode of video signal processing.

BACKGROUND

Increasing use of digitally operating video studio apparatus, for example digital mixers, digital synchronizers, recording apparatus, and the like, require apparatus to digitize analog color video signals, that is, to convert the analog color video signals to digital form, so that they can be processed in digital apparatus. When converting analog color signals into digital form, separate coding has been found particularly desirable because this mode of coding is independent of existing analog color TV systems. Separate coding refers to an arrangement in which a color TV signal, present in accordance with any one of the known and customary systems, is separated into a brightness or luminance signal portion Y and into chrominance signal portions U, V, in which the chrominance signal portions have known characteristics. In order to mix or superimpose two digital video signals, a control is needed. The control signal can be derived in either the chroma-key or the luminance-key mode, from one of the two video signal portions.

THE INVENTION

It is an object to provide a method and system to generate a control signal which permits mixing or superimposing two video signals in which the control signal is digitally derived.

Briefly, a first multiplying factor, corresponding to the slope (m) of the angle that determines the desired key color in the complex plane of U/V, and the digitized respective types of chroma signal components, that is, the U and V components, key color is represented by the angle $\phi$ in the color plate of the chroma components U and V. (For further information, reference is made to "Principles of Color Television", by McIlwain and Dean, published by John Wiley & Sons, Inc. 1956, p. 164 et seq.). The multiplied chroma signal component of one type, for example the U-type, is then subtracted from the chroma signal of the other type, then the V type, to provide a subtracted signal; the subtracted signal is then converted to form an absolute value thereof. A second multiplying factor is obtained in accordance with a selected input, corresponding to the angle or the band of the chroma signal component, or sector. The digitized respective types of chroma signal components are alternately multiplied, in phase synchronization with the first multiplying step, with the second multiplying factor to obtain a second multiplied chroma signal component which, then, is converted into an absolute value. The absolute values of the first processed signal and of the second processed signal are then compared to derive a comparison signal. The comparison signal is then compared with a minimum chroma saturation signal, representative of minimum chroma saturation and, if it exceeds that minimum level, is derived as an output to furnish the digital control signal.

The system includes multipliers, and decoders to derive the respective multiplying factors, and other signal processing apparatus, all of which operate digitally, and which can be of any well known and standard electronic component or subsystem construction.

The system and method of the present invention has the advantage over the chroma-key method known from analog technology that the generation of the digital control signal is much simpler and much less subject to interference or disturbances. The method and system permits selection of any color point on the color plane.

DRAWINGS

FIG. 2b illustrates wave forms arising in the portion of the system of FIG. 2a;

FIG. 3b shows some wave forms which arise in the system of FIG. 3a; and

Figure 1:
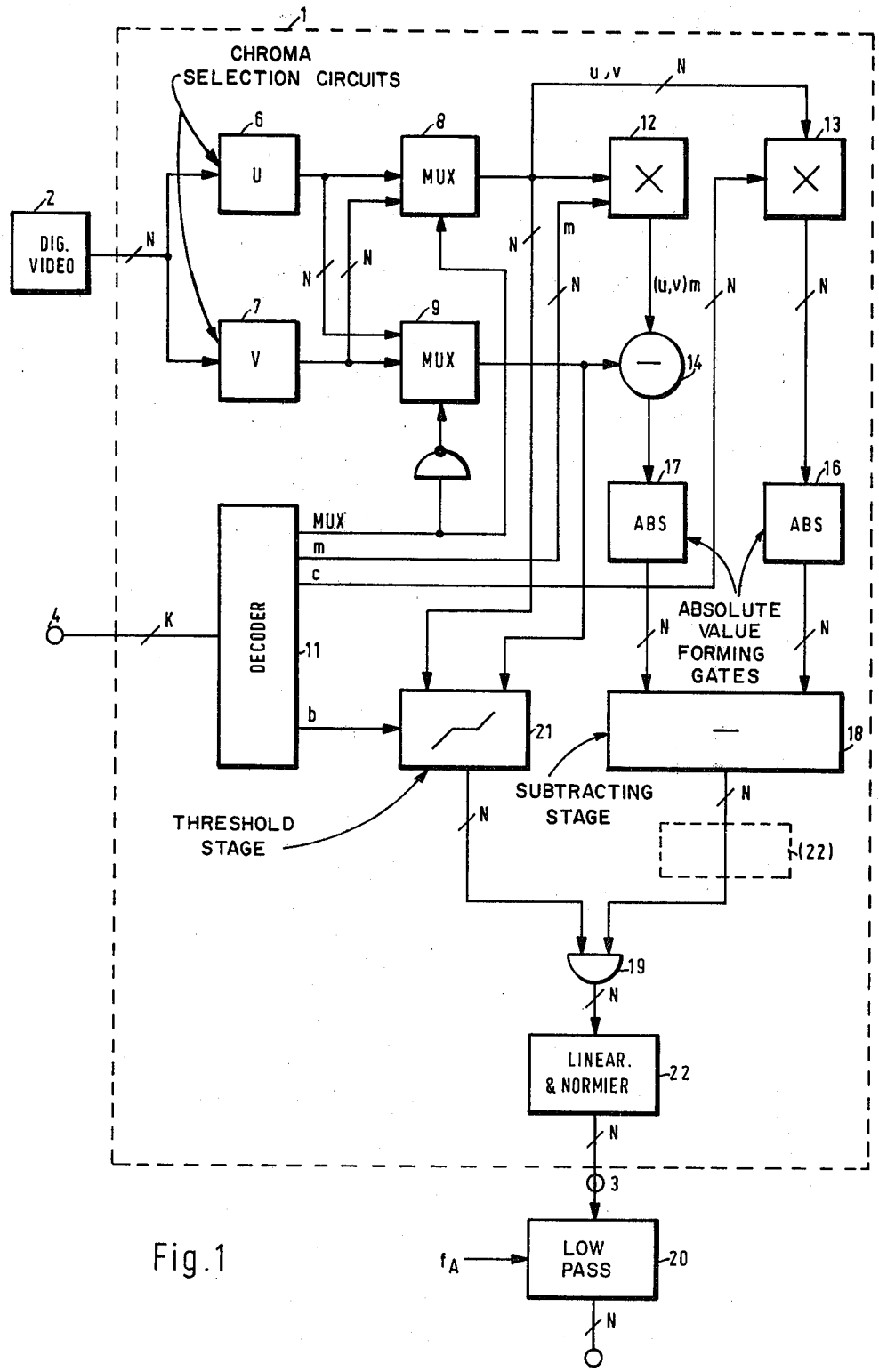
FIG. 1 is a general block diagram of a system which carries out the method.

A chroma-key signal generator 1 is shown in FIG. 1, which has an input connected to the output of a digital video signal source 2. The output 3 of the generator provides a digital control signal for superimposition, or switching for switching-over between two video signal paths. The control input 4 of the generator 1 has a digital signal appearing thereat with $K \geq N$, in which $N=8$ bits which transmit various control functions, e.g. the angle for the selected color, the threshold signal for minimum color saturation, and the window of the color sector. The desired key color is represented by the angle $\phi$ in the color plate of the chroma components U and V. (For further information, reference is made to "Principles of Color Television", by McIlwain and Dean, published by John Wiley & Sons, Inc., 1956, p. 164 et seq.).

The digital video source 2 is connected to one each of a specific chroma selection circuit 6,7, for the respective U and V signals. The outputs of the selection circuit 6, 7 are connected to a respective multiplexer 8, 9 which, depending upon selection, are rendered conductive under control over the signal at terminal 4, so that they supply, selectively, either a U signal or a V signal. The connection is effected by means of a signal which is derived from a decoder 11, connected to the control inputs 8 of the multiplexers 8, 9, supplied directly to the multiplexer 8 and supplied to the multiplexer 9 over an inverter.

For example, if the desired color switching point is between 45° and 135°, or between 225° and 315° of the U/V complex plane, respectively, then the V color signal is switched from the multiplexer 8 to the multiplier stages 12, 13 and, simultaneously, the U color component signal is switched from multiplexer 9 to the subtracting stage 14. If, however, and as illustrated in FIG. 1, the desired switching color type is in the remaining angular ranges, then the U chroma component signal is switched to the multiplier stage 12 and 13 and, simultaneously, the V chroma signal component is applied by the multiplexer 9 to the subtracting stage 14—as shown in FIG. 1. The desired switching mode is communicated to the input of the decoder 11, connected to the control input terminal 4. Transfer of the chroma component signals U and V occurs with a resolution of N=8 bits. The multiplexer switching signal can be transferred as a 1-bit signal.

The multiplying stage 12 is controlled by the decoder 11 with a rising signal m which corresponds to the cotangent for the angular range 45° to 135° and 225° to 315°, and to the tangent for the remaining angular ranges of the angle signal applied to the terminal 4 of the selected color.

The second multiplying stage 13 is also controlled by the decoder 11 and supplied with a signal c which corresponds to the angle window corresponding to a color component or sector, as selected by an input signal of terminal 4 to the decoder.

The particular control signals m and c are obtained from the decoder 11 under command of the signal connected to the control terminal 4.

The output of the multiplying stage 12 is connected to one input of a subtracting stage 14, the other input of which has the output of the multiplexer 9 applied thereto. The output of the subtracting stage 14 then, in accordance with an example and as illustrated in FIG. 1, will have a signal thereon having the composition of components v−m·u. The output of the second multiplying stage 13 then will have the signal c·u thereat. Gates 16 and 17 form absolute values of the output signals of the multiplying stage 13 and the subtracting stage 14, so that the outputs from the gates 16, 17 will be |v−m·u| and |c·u|. The outputs of the two gates 16, 17 are connected to a further subtracting stage 18, which functions as a comparator and in which a comparison of the signals applied thereto is effected as follows: |v−m·u| ≦ |c·u|. The output of stage 18 is connected to one input of an AND-gate 19. The other input of the AND-gate 19 has an output from a threshold stage 21 applied thereto, which forms a threshold value signal for the minimum permissible color saturation. The threshold stage 21 has the output signals U, V from the multiplexer applied and, further, a threshold value control signal b from the decoder 11. This signal may be fixed. The comparison of the threshold value from the stage 21 with the signal from the comparator 18 is desirable since ambiguities for the switching signal are thereby avoided. Such ambiguities may occur in only minimally saturated colors.

The output of the AND-gate or network 19 will provide a digital control or switching signal of u or v≧b.

If only the sign of this switching signal is utilized, the switching signal will have sharp edges or flank transition changes or jumps which may lead to a visible, bothersome, and poorly structured surface upon transition from one video signal to another one being displayed. To generate fine structuring of the transition, a linearizing and normalizing stage 22 is provided. Stage 22 can be connected between the AND-network 19 and the output terminal 3; or, as shown in broken lines, between the subtracting or comparison stage 18 and the AND-network 19. It is only material that the linearizing and normalizing stage 22 be included in the signal derived, directly or indirectly, from the comparison or subtracting stage 18. Stage 22 divides the result of the stage 18 by (c·u) and multiplies the result by $2^N$, so that the output of the stage will be normalized to $2^N$ and will be linearized over the range of the permissible deviation (c·u). N, of course, corresponds to the resolution, that is, in the example given, N=8. Mathematically, then, the linearizing and normalizing network 22 carries out this operation $$\frac{|c \cdot u| - |u \cdot m - v|}{c \cdot u} \cdot 2^N.$$

The switching signal which has the cyclical frequency is derived from the output of the stage 22 and applied to a digital low-pass filter 20. The low-pass filter 20, for one, carries out an interpolation of the vertical frequency component, and, for a second, filters horizontal frequencies and has the system frequency $f_A$ applied thereto as a clock frequency, for example. Generally, it is clocked with a frequency higher than the cyclical frequency. The coefficients are preferably so selected that the usual chroma band width is obtained. This permits a sloping of the steep switching flanks with minimum structural components.

Figure 2A:
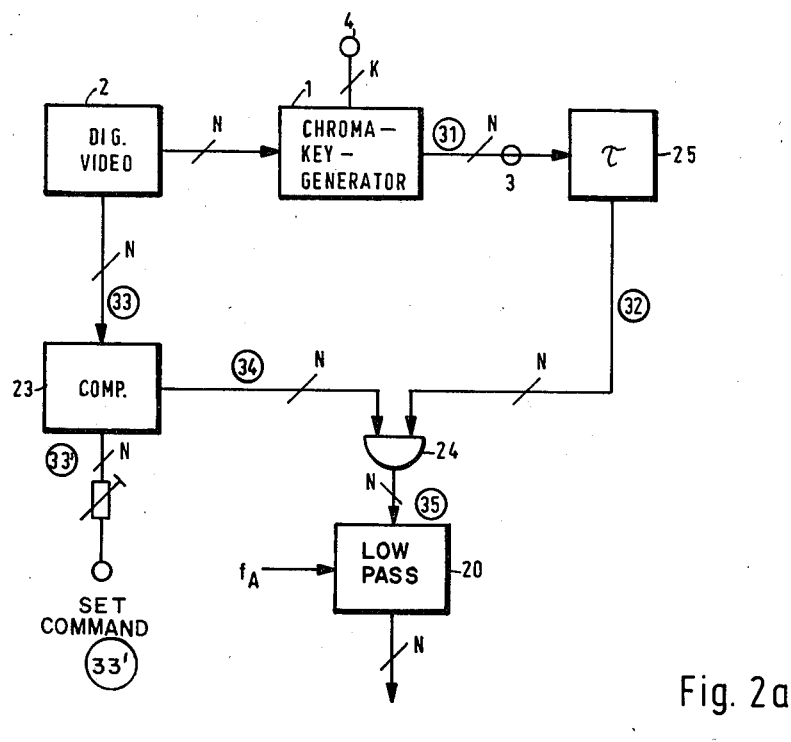
FIG. 2a is a fragmentary diagram illustrating a further embodiment of a portion of FIG. 1.

A preferred further development of the circuit illustrated in FIG. 1 is shown in FIG. 2a, which provides a digital switching signal with increased detail resolution. Normally, one may proceed from the assumption that, upon change from one switching signal color, a change in the luminance signal also occurs. The embodiment of FIG. 2a is particularly suitable to improve the resolution.

Figure 2B:
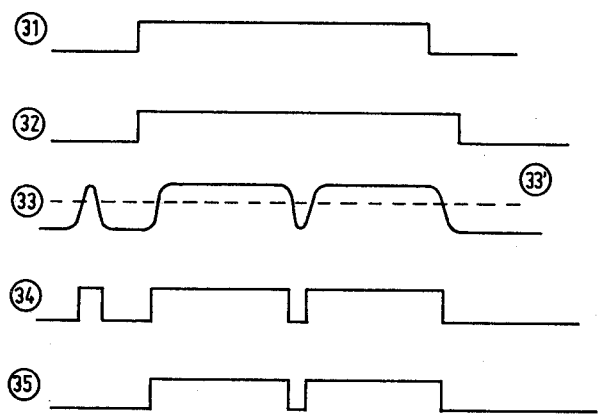

The digital video source 2 provides the chroma component signal U and V to the chroma-key generator 1, shown in FIG. 2a only as a single block. The output 3 of the generator 1 will have the switching signal 31—see FIG. 2b—appear thereat. Additionally, a digital luminance signal 33—FIG. 2b—is also derived from the digital video source 2. This luminance signal is applied to a comparator 23. Comparator 23 compares the luminance signal with a reference value, applied from a set command terminal, which provides a set command signal terminal 33'—see FIG. 2b. Depending on the comparison, the output from the comparator—signal 34—will be a binary signal evaluating the luminance signal with respect to the desired or command value signal 33'. The signal 34, derived from the comparator, is applied to an AND-gate, the other input of which is connected to the output terminal 3 of the chroma-key generator 1 through a signal spreading element 25, which converts the signal at the output from the chroma-key generator to a somewhat spread signal—compare signals 31, 32, FIG. 2b. The output from the AND-gate 24 thus will have a switching signal 35 with increased detail resolutions which, then, can be connected to the low-pass filter 20, as discussed in connection with FIG. 1.

Figure 3A:
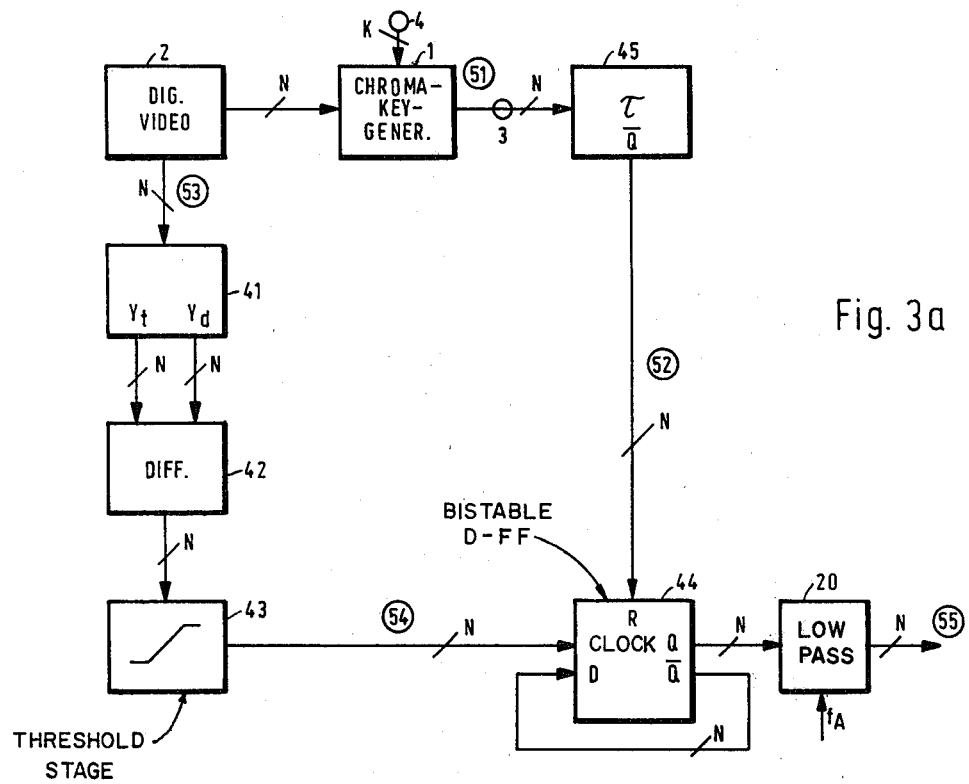
FIG. 3a is a further improvement of the system of FIG. 1.

A further improvement of the system illustrated in FIG. 2a is shown in FIG. 3a. The digital video signal source 2, besides the digitized chroma component signals U and V, also provides the digital brightness or luminance signal 53—see FIG. 3b, where the signal is illustrated in analog form, compare also FIG. 2b, signal 33. The luminance signal is applied to a stage 41 which has two output terminals. At one output terminal, a continuous average value of the luminance signal $Y_d$ is formed by digital filtering and applied to the output as shown, $Y_d$ of element 41. This formation can be over the last three to ten values at each instance. The second output terminal provides for the appropriated delay of the luminance signal, and is available at output $Y_t$. The two signals $Y_d$ and $Y_t$ are applied to a subtracting differentiator 42.

Figure 3B:
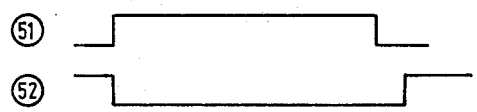

The output signal from the differentiator is applied to a threshold stage 43 in which a pulse-type signal 54—see FIG. 3b—is generated. This signal is applied to the clock input of a bistable, for example D—flip-flop (FF) 44. The sign of the output signal 51 from the chroma-key generator 10 (see also signal 31, FIG. 2b) is time-stretched or expanded in element 45 to form a stretched signal 52—compare also signal 32, FIG. 2b—and inverted, and applied as inverted stretched signal 52 to the reset input of the FF 44. The inverting output of the FF 44 is connected back to the D—terminal thereof.

The direct output of FF 44 is applied over the digital low-pass filter 20, from which the signal 55—see also FIG. 3b—can be derived. Signal 55 shows that the signal derived from the embodiment of FIG. 3a has luminance band width if the value of a luminance word deviates by a predetermined amount from the average value, and the extended or spread switching signal 52—FIG. 3b—has been generated.

Figure 4:
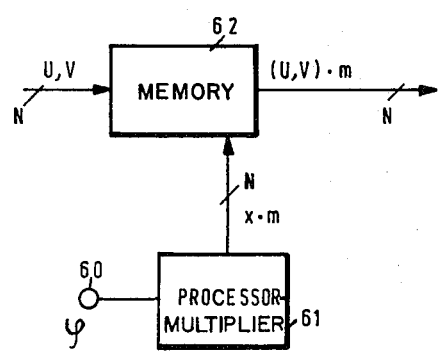
FIG. 4 is a block diagram of a preferred detail of the circuit of FIG. 1.

The multiplying stage 12 of FIG. 1 is, in accordance with a preferred embodiment of the invention, constructed in accordance with the block diagram of FIG. 4. This multiplier stage has an improved processing time. After setting of a new angular value $\phi$, i.e. a new desired key color, at the input 60 of a processor 61 which forms part of the decoder 11 (FIG. 1), all products of x·m are calculated, wherein x = 1 ... 256, and are placed in a memory 62 at an address u or v, respectively. In shortest time after application of a new value of u or v, the output from the memory 62 will provide the result u·m or v·m upon application of a new value for the signal u or v.

Various changes and modifications may be made, and features described in connection with any one of the embodiments may be used with any of the others, within the scope of the inventive concept.

I claim:

1. Method of deriving a digital control signal of video frequency from a digital video signal (Y; U, V) comprising the steps of
    selecting a desired key color;
    deriving a first multiplying factor (m) corresponding to the slope of the portion of the angle that determines desired passage through null of the key color;
    wherein the desired key color is represented by an angle $\phi$ in the color plate of chroma components (U, V);
    alternately multiplying the digitized respective types of chroma signal components (U, V) with said first factor to obtain a first multiplied respective chroma signal component (u·m; v·m);
    subtracting the multiplied chroma signal component of the first type (u·m) from the chroma signal component of the other type (then v) to provide a subtraction signal (v−u·m; u−v·m);
    forming an absolute value of said subtracted signal (|v−u·m|; |u−v·m|);
    selecting an angle window, or band of the chroma signal sector;
    deriving a second multiplying factor (c) corresponding to the selected angle window or band of the chroma signal component, or sector;
    alternately multiplying the digitized respective types of the chroma signal components, in phase synchronism with said first multiplying step, with said second factor to obtain a second multiplied chroma signal component (u·c; v·c);
    forming an absolute value of said multiplied second chroma signal components (|u·c|; |v·c|);
    comparing said absolute values
    $|v−u·m| \geq |u·c|; |u−v·m| \geq |uv·c|$
    and deriving a comparison signal;
    providing a minimum chroma saturation signal (b) representative of a minimum chroma saturation level;
    and furnishing said digital control signal if said comparison signal has a positive value and is at least equal to the minimum chroma saturation level signal (b).

2. Method according to claim 1, including the step of storing the slope (m) of the angle of the chroma signal in a memory (62), and addressing the memory in accordance with a color identification angle address.

3. Method according to claim 1, including the step of providing a memory (62);
    carrying out said step of multiplying the digitized chroma signal components with said first multiplying factor for the selected slope rate of that angle for all possible values of said factor;
    storing the multiplied results in said memory (62) at respective addresses;
    and recalculating the multiplied values for different slopes of said angle and restoring the resultant multiplied values in the memory for a different selected rise rate or slope;
    and further including the step of reading-out from said memory the results of the multiplication for the then selected operating mode having the then selected slope rate of said angle.

4. Method according to claim 1, including the step of setting the absolute value of said subtracted signal at a fixed value.

5. Method according to claim 1, including the step of linearizing and normalizing the digital control signal by multiplying said comparison signal with a factor $2^N$ wherein N is the resolution factor of the digitized video signal.

6. Method according to claim 5, wherein said step of normalizing the signal comprises multiplying said digital control signal by said factor $2^N$.

7. Method according to claim 1, further including the step of low-pass filtering the digital control signal with a vertical video frequency reference.

8. Method according to claim 1, further including the step of low-pass filtering the digital control signal with a reference signal of horizontal frequency and higher than the cyclical frequency of the digital video signal.

9. Method according to claim 1, including the step of deriving a luminance signal;
    comparing the luminance signal with a reference signal (33');
    and switching said digital control signal to an output if and only if the luminance signal and said reference have a predetermined relationship.

10. Method according to claim 1, further including the step of
    deriving a luminance signal;
    analyzing the luminance signal with respect to level changes thereof;
    and switching said digital control signal to an output if and only if the luminance signal has a predetermined change of value.

11. Method according to claim 1, wherein said method is operative in the chroma-key mode, and said digital control system is compatible with chroma-key control systems.

12. System to generate a digital control signal of video frequency from a digital video signal (Y; U, V) comprising a digital video signal source (2);

chroma signal component selection circuits (6, 7) respectively selecting a respective signal component (U, V);

multiplex stages (8, 9) having, respectively, the respective chroma signal component signals (U, V) applied thereto, connected to the respective chroma signal selection circuits;

a decoder (11) having a coded control signal (4) connected thereto;

said decoder (11) being connected to the multiplex stages (8, 9) to control connection of said multiplex stages under selective control, or command, of said coded control signal (4), such that, alternately, the respective chroma signal components are derivable from the outputs of said multiplex selection stages;

a first multiplier (12) being connected to the output of one of the multiplex stages (8) and multiplying the output signal from said multiplex stage with a factor corresponding to the slope (m) of the angle of the desired chroma signal function, said factor being decoded in the decoder (11) and applied to said multiplier;

a second multiplier (13) connected to said one multiplex stage (8) and multiplying the signal therefrom by a selected factor (c) corresponding to the angle of the band or window of said chroma signal component (e.g. u) derived from said first multiplex stage (8);

a subtracting stage (14) connected to the second multiplexing stage (9) to said first multiplying stage (12) and subtracting the multiplied chroma signal component derived from said first multiplier (12) from the chroma signal component derived from the second multiplexing stage (9);

first and second absolute-value-forming gates (16, 17), respectively connected to the second multiplier (13) and to the subtracting stage (14) to form absolute-value signals;

a comparator or second subtracting stage (18) connected to and controlled by the outputs of said absolute-value-forming stages (16, 17) and comparing said absolute-value signals to derive a comparison signal at its output;

threshold means (21) connected to receive the chroma component signals and providing a minimum chroma saturation signal output;

and circuit means (19) connecting said comparison signal to an output terminal (3) if said comparison signal exceeds the minimum chroma saturation level threshold, said control signal being derivable from said output (3).

13. System according to claim 12, further including a linearizing-and-normalizing stage (22) connected to the output (3) said network including (FIG. 2a) a comparator (23) having a set command signal (33') applied thereto to provide a luminescence reference, said comparator having applied thereto the luminescence (Y) component of the digital video signal and providing an output if, and only if, the luminescence signal exceeds the reference value;

and logic connection means (24) passing the output signal from the output terminal (3) if, and only if, the comparator provides an output indicative of a luminescence signal in excess of said reference level.

14. System according to claim 13, further including a signal spreading or stretching timing network (25) connected between the output terminal (3) and said logic connection means to apply a stretched output control signal.

15. System according to claim 12, further including (FIG. 3b) means (41) having the digital luminescence component (Y) of the digital video signal applied thereto and providing an averaged output value ($Y_d$) at a first output terminal thereof, and further providing a delayed actual luminescence signal ($Y_t$) at a second output thereof;

a differentiator (42) receiving the outputs from said first and second output terminals and providing a difference signal;

a threshold stage (43) connected to receive said difference signal and comparing said difference signal with a predetermined threshold;

a bistable circuit (44) having said threshold signal connected to the clock input thereof, the control signal from the output terminal (3) to the reset terminal thereof, and the inverting output connected back to the set (D) input, the output signal from the system being derived from the direct output of the bistable circuit (44).

16. System according to claim 15, further including a signal spreading or stretching circuit (45) connected between the output terminal (3) and the reset input (R) of the bistable circuit.

17. System according to claim 12, further including a low-pass filter (20) connected between the output terminal (3) and the final output from which the control signal can be derived.

* * * * *